July 29, 1924.

A. HAAS 1,503,155

MACHINE FOR THE MANUFACTURE OF ENVELOPES

Filed May 9, 1921 6 Sheets-Sheet 1

July 29, 1924.

A. HAAS 1,503,155

MACHINE FOR THE MANUFACTURE OF ENVELOPES

Filed May 9, 1921

Inventor
Adrian Haas,
By [signature]
Atty.

July 29, 1924.

A. HAAS 1,503,155

MACHINE FOR THE MANUFACTURE OF ENVELOPES

Filed May 9, 1921

Inventor
Adrian Haas,
By [signature]
Atty.

Fig. 18.

Patented July 29, 1924.

1,503,155

UNITED STATES PATENT OFFICE.

ADRIAN HAAS, OF HOUNSLOW, ENGLAND.

MACHINE FOR THE MANUFACTURE OF ENVELOPES.

Application filed May 9, 1921. Serial No. 467,882.

*To all whom it may concern:*

Be it known that I, ADRIAN HAAS, a citizen of the United States of America, of No. 191 Cromwell Road, Hounslow, in the county of Middlesex, England, have invented certain new and useful Improvements in and Relating to Machines for the Manufacture of Envelopes, of which the following is a specification.

This invention refers to improvements in and relating to machines for the manufacture of envelopes.

According to this invention, two or multiples of two or more envelopes are produced side by side from a single web of paper, the gum or adhesive being applied at a place or places intermediate of the width, for example, between two blanks, and before the cutting, creasing and folding operations take place, one application of gum, consequently serving for the closing flaps of adjacent pairs of envelopes. The paper, mounted on a reel or the like, is unwound and caused to move, in the first instance continuously and, preferably, at a uniform speed during which time it is gummed or furnished with adhesive along a space or spaces in the middle of the length or at a suitable place or places between the edges of the paper. The paper while moving at a uniform speed passes over a series of rollers to allow the gum to dry naturally in the air, or it may be assisted by heat, if desired. Preferably the rollers are in two superposed series to ensure sufficient length of travel and time for the gum to dry before the next operation. By this means the webs hang down in straight parallel loops and only require to be supported by a relatively small number of rollers, having regard to the length of web being dried. The paper is then cut longitudinally by slitting knives or otherwise and creased for the folds of the closing and bottom flaps after which it is allowed to form a loop or to sag and is then caused to be fed forward, at intervals to enable it to be submitted, successively, to punching operations to form the commencement of the production of the sides of the bottom and closing flaps, to cutting operations at the places punched to complete the formation of the back or bottom flap and gummed closing flap or to a single cutting operation, producing the same result as the successive punching and cutting operations. If desired, other knives may be provided for trimming or finally shaping the closing flaps. Or, on the other hand, the cutting or slotting of the web to form as well as trim the closing flaps may be effected at the same operation as that at which the sides of the bottom and side flaps are formed. The paper is then subjected to an operation for, successively folding the bottom flap, creasing the side flaps where they join the body or part forming the face of the envelope, cutting to divide the side flaps of one envelope blank from another and in known manner to a feeding operation at right angles to the direction originally taken, one half of the envelope blanks passing off to one side and the other half to the other side, where the side flaps are in each case gummed and folded over on to the back after which the gummed closing flap is folded down on to the bottom and the finished envelopes are delivered.

In carrying the invention into effect and according to the construction shown in Figures 1 to 8 the apparatus is mounted on a bed, suitably comprising standards or framing $a$ and a table or series of table parts or supports marked $b$ a driving shaft $c$ revoluble in bearings on one side of the bed. The bed or table $b$ is conveniently made in sections so as to be slid along and racks and pinions may be provided to facilitate the movement and adjustment. The parts $b$ are then fixed at suitable places on the framing according to the positions required for performing the various operations. The driving shaft $c$ is furnished near one end with means, such as a fly wheel $d$ and fast and loose pulleys $e$. This shaft by a belt $f$ and pulleys $g$ and $h$ communicates motion to a countershaft $i$ having mounted thereon a friction wheel $k$ adapted to be shifted in the axial direction, to revolve with the countershaft and to be retained in position in any desired place along the said shaft for permitting of varying the speed of the web of paper $l$. This is conveniently effected by providing a double armed forked lever $m$ and a slotted quadrant $n$ on which the lever can be clamped by means of a screw threaded stud $o$ and nut (not shown) or by a detent adapted to engage in any one of a series of teeth on the quadrant or otherwise in any convenient manner. This friction wheel $k$ is adapted to engage with the flat face of a larger friction wheel $p$ mounted on a second countershaft $q$ which is conveniently made integral with a roller over which the paper web passes as it is unrolled from the reel or drum $r$ of paper and a suitable guide roll or rolls, such as $s$ is or are provided for conducting the paper in the proper direction where required. The countershaft or roller $q$ is, conveniently, provided with a sprocket wheel $t$ which by a chain $u$ communicates motion to a shaft $v$ and this in turn communicates motion by a roller thereon to roller $w$ pressed towards it by a spring, not shown. After being unrolled from the drum $r$ or as shown while the unrolling is taking place the paper $l$ has applied thereto a strip of gum or other adhesive by means of an appropriate roller or system of rollers or revolving brushes partially immersed in a trough or by means of a fountain gummer or the like diagrammatically indicated at $x$. Wherever necessary, the guide or other rollers may be flanged or the rollers may have adjustable flanges mounted thereon to suit paper of different widths. The rollers, under which the paper passes after the gumming operation, are provided with an annular groove or grooves such as $q^1$ (Figure 2), to register with the strip of wet gum to prevent the latter from coming into contact with the surface of such rollers. After the gumming operation the paper passes over a series of rollers and may have a slight tension imparted thereto to prevent it from becoming distorted as the gum dries. The rollers are conveniently mounted in two superposed series $y$ and $z$ and of the desired number to ensure sufficient length of travel and time for the gum to dry before the next operations take place  The rollers $z$, if not those marked $y$ are suitably provided with annular grooves, such as $q^1$. The drying rollers $y$ are conveniently fitted at one end with sprocket wheels with which engage the chain $u$ in order to positively drive the rollers $y$. After passing over the drying rollers $y$ and $z$ the paper $l$ is conveniently passed between a pair of rollers, shafts or spindles 1 and 2 of which that marked 1 is furnished with a sprocket wheel and driven by the chain $u$. The shaft or roller 2 is pressed towards the shaft or roller 1 by screw $s^1$ in the well known manner to provide the necessary frictional contact. The paper web is then allowed to hang in a loop $l^1$ to avoid tearing it during the subsequent operations which are adapted to take place at intervals, the feed being consequently intermittent. According to the number of envelopes to be obtained from the width of the paper the latter is divided by a slitting knife or knives. Assuming the web be too wide a portion may be cut off by a pair of rotary slitting knives 3 and 4 mounted on the shafts $w$ and $v$ respectively. These shafts $v$ and $w$ are conveniently geared together at their other ends by spur wheels $v^4$ and $w^5$ (Figure 2) and the shaft $v$ also carries a pulley $v^3$ (Figures 1 and 2) which by belt 6 communicates motion to a pulley 7 engaging, by a friction clutch 8, a shaft 9 adapted to carry a reel 10 on which the surplus paper $l^2$ is adapted to be wound. The rest of the web of paper, after passing over the drying rollers $y$ and under the drying rollers $z$ is then cut into two webs, for instance by rotary slitting knives 11 and 12 which are conveniently mounted on the shafts 1 and 2 respectively and after hanging in loops $l^1$ pass over a guide roller $v^7$ and down to a guide or guides 13 for causing the webs to continue their travel along the table at some little distance from each other, as shown, for example, in the diagram Figure 8. Mounted on the spindles 1 and 2 are two sets of creasing rollers 14, 15 and 16, 17 (Figure 2) each set or series being adapted to feed the paper web and to produce two sets of creases $c^4$, $c^5$ (see also Figure 8) for the closing and bottom flaps of one of the two series of envelopes to be produced on the table $b$. The rollers 15 and 17 are mounted on the shaft 2 and this shaft is not only driven by spur gearing 111 and 112 from the shaft 1 see Figures 1, 2 and 8, but is also pressed towards it by set-screws, such as $s^1$ (Figure 1) as aforesaid.

A shaft has conveniently mounted thereon a series of cams, each of which is adapted by lever mechanism, to operate various devices for punching, cutting, folding, creasing and cutting off the blank from the paper. The cams may be mounted on a cam shaft parallel to the driving shaft and adapted to be driven from the latter by gearing, but preferably and for the sake of simplicity the cams are shown mounted on the driving shaft.

Figure 1:
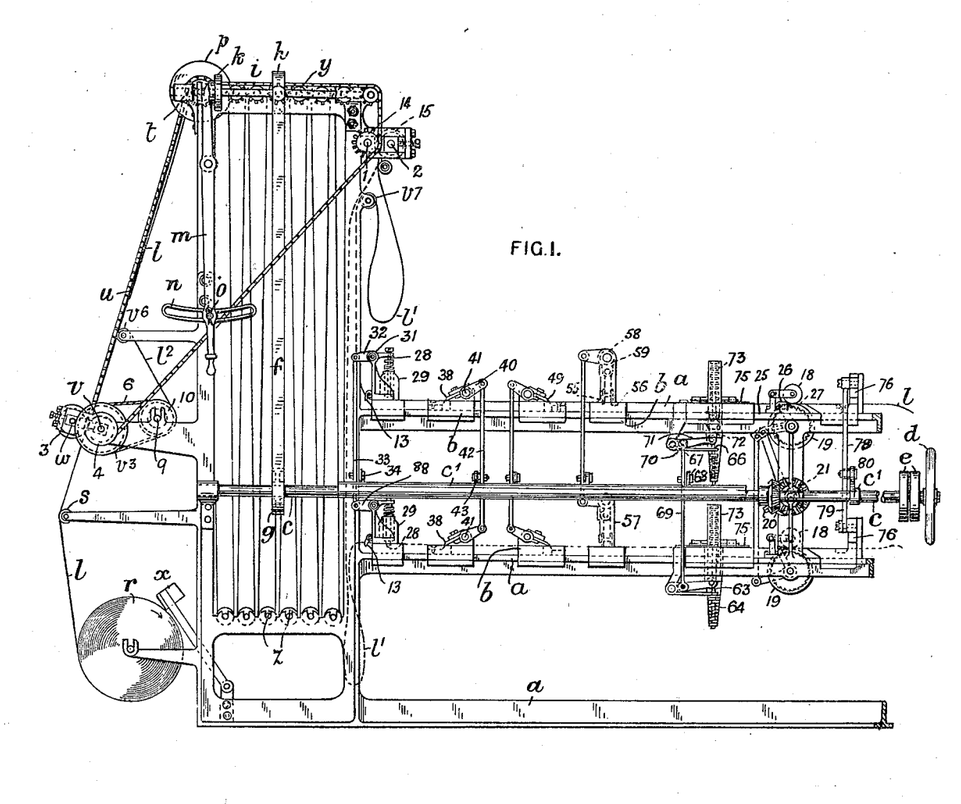
Figure 1 of the accompanying drawings is a side elevation of the greater part of a machine constructed according to this invention.
Figure 2:
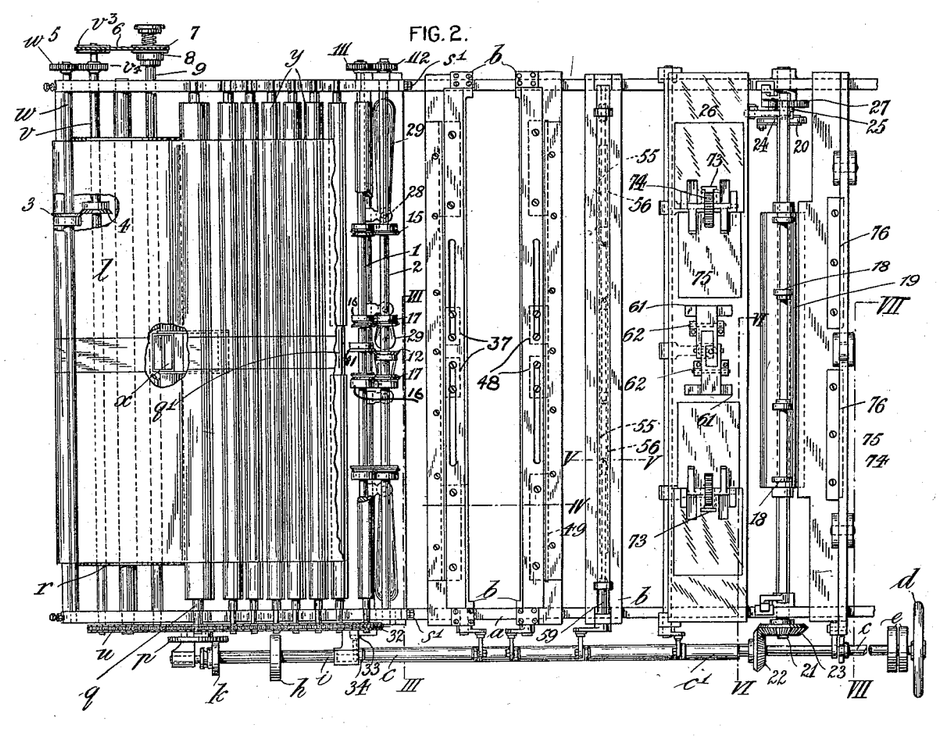
Figure 2 is a plan thereof.
Figures 3, 4, 5, 6, 7:
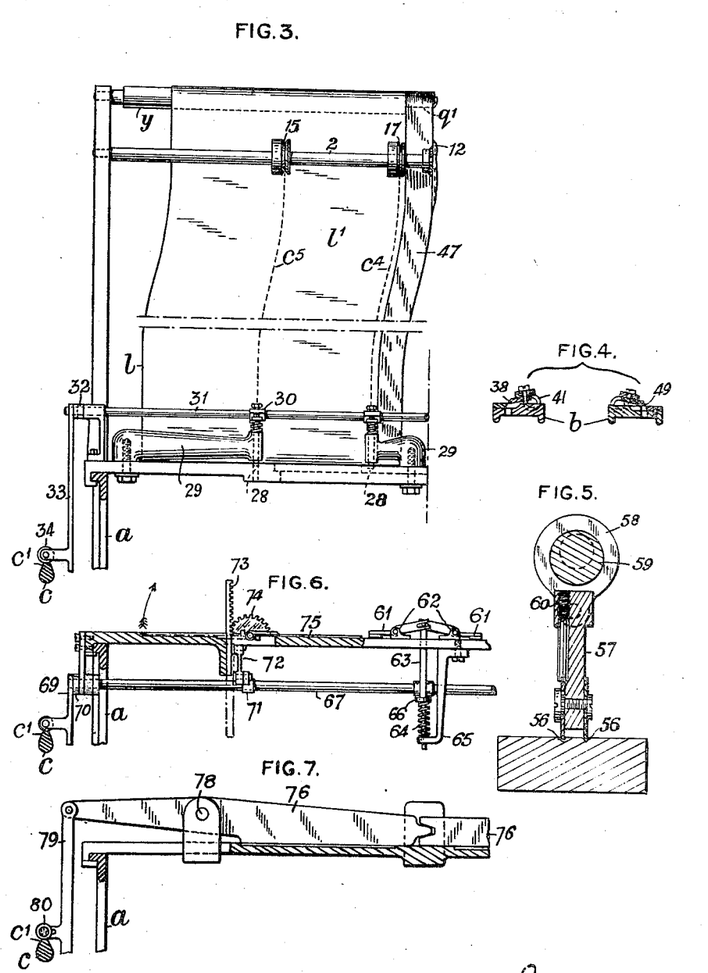
Figure 3 is a detail partly in end elevation and partly in transverse section on the line III—III Figure 2, showing a pair of punching devices for commencing the formation of a slot.
Figure 4 is a detail in longitudinal section on the line IV—IV Figure 2, showing two knives for successively operating to complete the formation of a slot.
Figure 5 is a detail in longitudinal section on the line V—V Figure 2, for forming two creases prior to the folding of the bottom flap.
Figure 6 is a detail partly in end elevation and partly in transverse section on the line VI—VI Figure 2, for illustrating the folding of the bottom flap.
Figure 7 is a similar detail view on the line VII—VII Figure 2, and showing how the side flaps of adjacent blanks are severed.
Figures 8, 9:
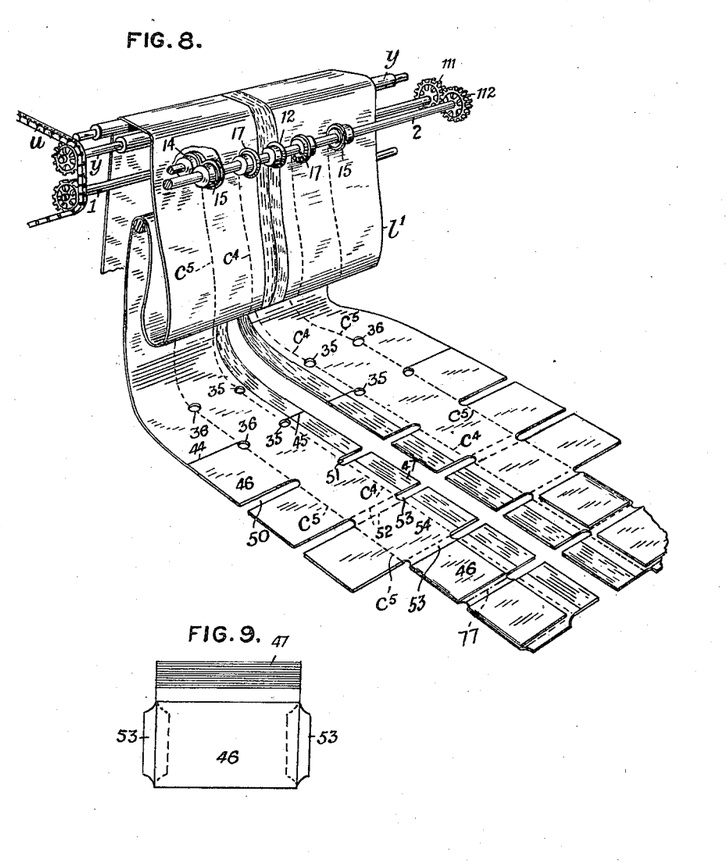
Figure 8 is a diagrammatic perspective view showing the web cut, creased longitudinally, punched, cut twice, creased transversely, the folding over of the bottom and the cut severing the side flaps of adjacent blanks
Figure 9 shows the envelope in the condition produced according to this invention.

On the table $b$ beyond the drying rollers $y$, $z$, and near the right or delivery end of the table is mounted a pair of feed rollers 18 and 19. One or both of the feed rollers is or are intermittently rotated by means of an eccentric 20. As shown, the eccentric 20 (Figures 1 and 2) mounted on a shaft 21 at the back of the machine is driven by mitre wheels 22 and 23 from the shaft $c$ or elsewhere. The eccentric 20 is furnished with a strap and rod 24 connected to a ratchet lever 25. The pawl 26 of the ratchet lever engages in a ratchet wheel 27 mounted on or integral with the journal of the roller 19. If desired, the ratchet wheel may be positively engaged by a stop or the like at the end of its partial rotation but this is not essential. On the table is also mounted, if desired, a presser foot to hold the paper while being operated on and the sides of the closing flap may also be trimmed or shaped by means of knives operating in the vicinity both of which features will be referred to later on. Four vertically acting punches 28 Figures 1, 2 and 3 (of which two only are shown in Figure 3) are mounted in guides 29 fixed to the table $b$ and are operated by a cam lever 30 keyed to a cross shaft or rocking shaft 31 having also at one end a lever 32 which by a rod 33 and cam roller or bowl 34 is adapted to be operated by the cam $c^1$ on the driving shaft $c$. The four punches 28 are adapted to produce four round holes in the width of the paper, mounted on the table and two of these punches operate on the web in the formation of each envelope blank. In each case, one of these holes is nearer the inner edge of the web than is the other hole from the outer edge. The innermost hole 35 (Figure 8) is adapted to produce a portion of the gummed flap and a side flap and the outer hole 36 produces the corresponding portion of the side flap and the back flap or bottom of the envelope as will be hereinafter more clearly set forth. The web then passes to a cutting device having two pivoted or reciprocating knives 37 and 38 (Figure 2) for each envelope blank, such knives being operated by a lever 40 on the cross shaft 41 which also carries the knives and a rod 42 carrying a cam bowl 43 by which latter the motion of the cam $c^1$ is transmitted from the cam shaft $c$. The cutting edge of the knife 38 extends from the periphery of one hole 36 to the outer edge of the paper to produce a cut 44 (Figure 8) which forms one edge or side of the back flap 46, while the other knife 37 Fig. 2 similarly extends from the other hole 35 to the inner edge of the paper to produce a cut 45 for forming the edge or side of the closing or gummed flap 47. The next movement of the intermittently operating feed rolls brings the paper under a second series of similar knives 48 and 49 (Figure 2) adapted to produce a cut 50 (Figure 8) by means similar to those just described to form the other side or edge of the back flap 46 and a cut 51 to produce the other side or edge of the closing flap 47; the oblong pieces of paper separated between the two envelope blanks in line and adjacent to each other then fall or go to waste. The operation taking place at the end of the next movement of the paper consists in imparting two parallel creases 52 (Figure 8) at the junction of the side flaps 53 with the body portion 54 of the envelope blank, one crease for each side flap. The creasing devices suitably consist of two steel plates 55, 56 (Figures 1, 2 and 5) mounted on a bar 57 having a strap or sleeve 58 at each end mounted on an eccentric cross shaft 59 operated as before from the cam $c^1$. Preferably, one of the plates (55) is furnished with a spring 60 and is loose on the bar 57 to prevent the paper from being torn when the plates form the creases. The succeeding movement brings the paper to a folding device which raises and folds down the back flap 46, and while the folding is taking place a presser foot prevents the web from moving. As shown in Figures 1, 2 and 6 two presser feet 61, 61 pivoted to the table $b$ at 62, 62 are elastically operated by a rod 63 actuated by a spring 64 between a collar on the rod and its guide 65, the lever 66 on the cross shaft 67 (actuated from the cam $c'$ by means of a cam bowl 68 rod 69 and lever 70) being adapted to depress the rod 63 when the web is to be fed forward and so release the latter, but at other times the presser feet 61 hold the paper webs securely. When this occurs the movement of the cross shaft 67 is communicated by a lever 71 and link 72 to a vertically guided rack 73 engaging with a quadrant or pinion 74 provided with a metal plate 75 serving as a folding device. The position of parts shown in Figure 6 indicates that the folder 75 has caused the back flap 46 to be folded down at the crease $c^5$ on to the body portion 54 of the envelope as shown in the diagram Figure 8. The paper is again moved along, passing between the feed rollers 18 and 19 and then the side flap portions 53 (Figure 8) connecting two adjoining body or front portions 54 of the envelopes, are cut through by a knife 76 (Figures 1, 2 and 7) at 77 (Figure 8) so that the individual envelope blanks are entirely separated from each other. The knife 76 is pivoted at 78 and is operated by a rod 79 carrying a cam bowl 80 which is engaged by the cam $c^1$. Each envelope blank then appears as in full lines in Figure 9. The blanks from one strip of the divided web are received by an endless belt and caused to travel to the right, while the blanks from the other strip are received by a second belt and are caused to travel to the left in a known manner, where the side flaps 53 are, by suitable or known means, gummed and folded down on to the back of the envelope as shown in dotted lines in Figure 9. The closing flap 47 is then folded down on to the back and the finished envelopes are counted and finally dropped on each side of the complete machine into trays or elsewhere in any well known manner.

It should be noted that as shown in Figure 1 there may be two superposed tables for the purpose of producing separate series of envelopes or there may be more than two tables and the consequent number of paper webs. Moreover, by duplicating or correspondingly increasing the number of devices for gumming, slitting, creasing, punching and/or cutting, folding and so on, the output of the machine may be materially increased while still producing the movement of these devices by means of one cam shaft.

Referring to the modification described with reference to Figures 10, 11, 14 and 16, namely the means for cutting out the slots 81 and 82 (Figure 18) for forming the sides of the bottom flaps and closing flaps and for forming the side flaps at one operation instead of three operations, the slots 81 are formed by knives 83 (Figure 11) and the slots 82 are formed by knives 84.

Figure 18:
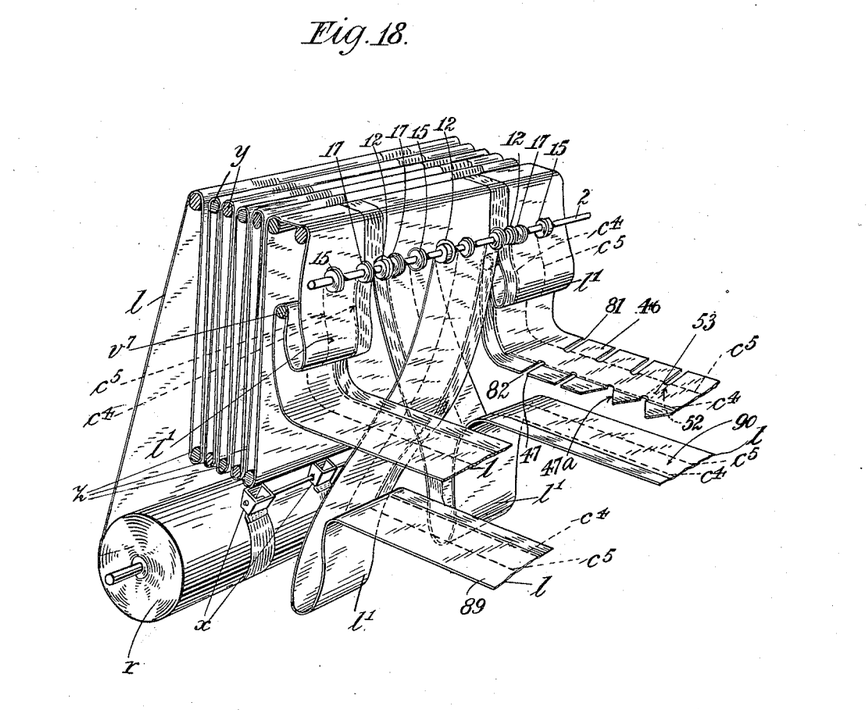

As in the previous instance, the driving and cam shaft $c$ is furnished with a cam, such as $c^1$ (Figure 3) which engages a roller 85 mounted on a rod 86, suitably guided at one end by being connected to a lever or otherwise and connected at its other end to a similar lever below (as marked) 88 (Figure 1) keyed to a transverse shaft mounted in bearings on the table or bed of the machine for cutting slots such as 81 and 82 in the upper webs, out of lower webs such as 89 and 90 (Figure 18). It should here be stated that the four webs may all hang down and be fed to the table without any of them crossing or if two do cross their place of crossing would be lower down than is shown in the diagram Figure 18. This transverse shaft 190 (Figures 10, 14 and 16) is, in turn furnished with armed levers 91 and 92 which, by double links 93, communicates motion to the free ends of the knives 83 and 84 mounted on the levers 94 and 95 pivoted at 96 and 97, respectively, and each knife is adapted to cut out a piece of paper from the web between two blanks to form the sides of the bottom flap 46, closing flap 47 and side flaps 53 (Figure 18). The pivots 96, 97, of the knives are mounted in bearings or brackets 98, 99 fixed to the table or bed $b$ the cutting edges of the knives 83, 84 are conveniently rectangular and the knives or cutters may merely consist of flat steel plates screwed to cast iron or cast steel levers 94, 95. The knives 83, 84 are conveniently made in the form of fingers with parallel sides and rounded at the end. The knives are also adapted to register with and descend into correspondingly formed slots in the bed and these slots may be faced with plates 100 and 101 and 102 and 103 (Figures 11 and 10) of phosphor bronze or other suitable metal, screwed to the bed $b$. It is however, obvious that the shape and length of the knives may be modified to conform to the particular shape of flaps to be made. Preferably each of the plates surrounding the slot is divided into two parts as shown so that the parts are capable of being separated or brought closer together for adjustment.

Figures 10, 11, 12, 13, 14, 15, 16, 17:
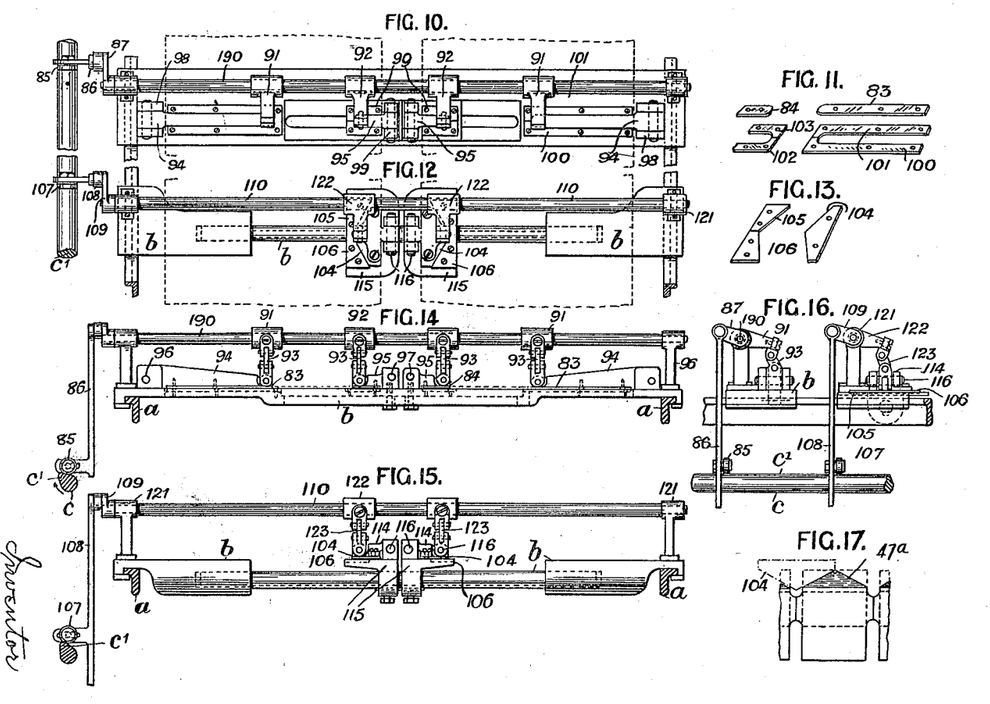
Figure 10 is a view in plan of part of the apparatus when constructed according to a modification for forming the slots at one operation and Figure 11 are details in perspective of the cutting devices or knives employed in Figure 10.
Figure 12 is a view in plan of part of the apparatus when constructed to trim the closing flap and Figure 13 are details in perspective of the cutting devices or knives employed in Figure 12.
Figure 14 is a sectional end elevation of Figure 10.
Figure 15 is a sectional end elevation of Figure 12.
Figure 16 is a side elevation of the details shown in Figures 10 and 12.
Figure 17 is a view of part of the web showing the whole of one envelope blank and parts of two adjoining blanks and Figure 18 is a diagrammatic perspective view showing the web gummed, cut to form two double series of blanks, creased longitudinally and ready for the series of operations illustrated by Figures 1 to 8 but modified by the slotting arrangement as in Figures 10, 11, 14 and 16 and the trimming as shown in Figures 12, 13, 15 and 16.

For trimming the closing flap to the angular shape 47$^a$, as shown in Figures 17 and 18, the machine may be provided with a knife such as marked 104 in Figures 12, 13 and 17 and the correspondingly formed fixed parts 105 and 106 (Figures 12 and 13) adapted to be screwed to the bed section $b$ mounted on the framing $a$. As shown in Figures 12, 15 and 16, the cam shaft $c$, in contact with the roller 107 mounted on the rod 108, actuates the lever 109 keyed to the shaft 110 mounted in bearings 121 in adjustable brackets screwed, or bolted to the bed section *b* which may also be made of separate parts (three in this case adapted to be assembled together). On the cross shaft 110 is keyed a pair of levers 122, 122 each of which by a series of links 123 is adapted to actuate a lever 114 to which is screwed the knife 104. The fixed knife parts 105 and 106, are as shown in Figures 12 and 15, screwed to a bracket 115 adjustable on the bed and the fulcrum pin 116 of each lever is mounted in a bracket 115. The knife 104 cuts off a portion of the gummed flap of each two adjoining envelope flaps at each operation.

The operations for creasing the part 52 at 53, folding the back flap 46 and separating each blank from the web is then carried out as described with reference to Figures 1 to 9.

I claim:—

1. In a machine of the character described, means for continuously feeding a web of paper during certain operations in the course of making envelopes, means for intermittently feeding the paper during subsequent operations, and severing devices for dividing the web into strips between the two sets of operations and during continuous movement of the web, substantially as set forth.

2. In a machine of the character described, means for continuously feeding a web of paper during pasting and paste-drying operations, means for intermittently feeding the paper during blank-forming operations, and severing devices for dividing the web into strips between the two sets of operations and during the continuous movement of the web substantially as set forth.

3. In a machine of the character described, mechanism for subjecting a web of paper first to continuous and then to intermittent motion during two respective sets of operations, severing means for dividing the web longitudinally during the continuous movement thereof, and means for causing the divided web to hang in loops after it has been so divided and before the web is subjected to intermittent movement, substantially as and for the purpose set forth.

4. In a machine of the character described, means for continuously feeding a web of paper during pasting and paste-drying operations, means for intermittently feeding the paper during blank-forming operations severing devices and creasing devices for simultaneously severing the web into longitudinal strips and longitudinally creasing the same, substantially as set forth.

5. In a machine of the character described, a paper carrying roll mounted on the machine framing, a pair of feed rollers on the framing, means for continuously rotating the feed rollers to feed a web of paper from said roll, means to apply adhesive to selected portions of the web during the continuous feeding thereof, two superposed series of parallel rollers mounted on said framing over and under which the web with the adhesive applied is caused to travel, means operative on said web to divide the same into longitudinal strips during its continuous travel, means for forming longitudinal creases in the web to constitute the folding lines of the closing and back flaps of the envelopes, a bed fixed to the machine frame, means to cause the strips to form loops after passing the continuously rotating feed rollers, feed mechanism intermittently operated to feed the strips from said loops and over said bed, cutting mecahnism operative on the strips to form transverse slots for the formation of the back flaps the closing flaps and partly the side flaps, creasing mechanism for forming transverse creases on the strips to constitute the folding lines for the side flaps, mechanism for folding the back and closing flaps, means for separating adjoining blanks from the strips to complete the side flaps, and mechanism for intermittently operating the said cutting, creasing, folding and separating means, as and for the purpose set forth.

6. In a machine of the character described, a continuously rotating cam shaft extending along the side of the machine and adjacent the bed thereof, an eccentric cross shaft mounted in bearings on said bed, means for communicating motion from the cam shaft to the cross shaft, a bar connected to said cross shaft and adapted to be reciprocated thereby, a series of creasing blades fixed to the bar, and a series of yielding creasing blades connected to said bar, the fixed and yielding creasing blades being adapted to coact with recesses formed in the said bed to effect the creasing of the blanks, substantially as set forth.

7. In a machine of the character described, a driving shaft, two series of drying rollers over and under which a web of paper is passed after application of adhesive thereto, a pair of feed rollers operative to continuously feed said web, and means comprising a friction disc mechanism for positively driving at various speeds one of the series of drying rollers and the feed rollers from the main driving shaft, substantially as set forth.

8. In a machine of the character described, a driving shaft, two series of drying rollers over and under which a paper web is passed after application thereto of adhesive material, a pair of combined feed and creasing rollers between which the dried paper web passes, spindles journaled in the machine frame for supporting the combined feed and creasing rollers, and variable speed gear operated by the main driving shaft and adapted to positively drive one of the series of drying rollers and the combined feed and creasing rollers, substantially as set forth.

9. In a machine of the character described, a pair of combined feed and creasing rollers between which a web of paper passes, and intergeared spindles supporting said rollers in bearings on the machine frame, a slitting knife member mounted on one of the spindles, a co-acting knife member mounted on the other of said spindles, and means to positively drive said spindles at a variable speed, substantially as set forth.

10. In a machine of the character described, a driving shaft, a roll carrying a web of paper, means for dividing the web, two superposed beds over each of which one of the webs is adapted to pass, means for continuously drawing the web from said roll during its division and prior to its passing on to said beds, means for applying adhesive to said webs during their continuous movement and at the place or places thereon which form the closing flaps of the envelopes, means for drying said adhesive during the said continuous movement, means for cutting each of the divided webs into two strips, means for forming longitudinal creases therein, means for intermittently feeding said strips along the beds, a series of intermittently operated devices for cutting and folding parts of the webs to form back and closing flaps, intermittently operated means for cutting and creasing parts of the webs to form the closing and side flaps and for severing the envelope blanks from the webs and cams on the driving shaft for effecting said intermittent operations substantially as set forth.

ADRIAN HAAS.